Feb. 5, 1963 S. D. SILLIMAN ET AL 3,076,899

DECIMAL PULSE REGISTER WITH REPEATING STAGES

Filed Sept. 25, 1958

7 Sheets-Sheet 1

WITNESSES

John E. Healy, Jr.

Ralph W. McIntire, Jr.

INVENTORS
Sheldon D. Silliman &
Willard A. Derr
BY
Ralph H. Swingle
ATTORNEY

Feb. 5, 1963 S. D. SILLIMAN ET AL 3,076,899

DECIMAL PULSE REGISTER WITH REPEATING STAGES

Filed Sept. 25, 1958 7 Sheets-Sheet 2

Feb. 5, 1963 S. D. SILLIMAN ET AL 3,076,899

DECIMAL PULSE REGISTER WITH REPEATING STAGES

Filed Sept. 25, 1958 7 Sheets-Sheet 4

United States Patent Office 3,076,899

Patented Feb. 5, 1963

3,076,899

DECIMAL PULSE REGISTER WITH REPEATING STAGES

Sheldon D. Silliman, Forest Hills, and Willard A. Derr, Pittsburgh, Pa., assignors to Westinghouse Electric Corporation, East Pittsburgh, Pa., a corporation of Pennsylvania Filed Sept. 25, 1958, Ser. No. 763,339
8 Claims. (Cl. 307—88.5)

This invention relates to decimal pulse registers and it has reference in particular to a static logic decimal pulse register having repeating register stages.

It is an object of this invention to provide a static-element pulse register that is simple and inexpensive to manufacture, and is reliable in operation.

It is a further object of this invention to provide a pulse register having a minimum number of repeating register stages for counting a maximum number of input pulses.

It is another object of this invention to provide a decimal pulse register which converts successive decimal input pulses to binary codes and which reads out the binary codes to provide a decimal indication of the total number of input pulses.

It is yet another object of this invention to provide a decimal pulse register providing a different binary code for each input pulse to be counted and a different static logic AND circuit responding to each binary code to indicate the occurrence of a pulse.

Other objects will, in part, be obvious and will, in part, be explained hereinafter.

In practicing this invention in accordance with one of its embodiments, a decimal pulse register is comprised of four repeating register stages which are interrelated to provide outputs for counting or registering fifteen consecutive pulse bits of information. The first three stages each consists of a primary phase and a secondary phase while the fourth or last stage consists of a primary phase only. Each phase consists basically of a static FLIP-FLOP memory circuit, and AND circuit for triggering the FLIP-FLOP to apply an ON signal to the succeeding phase and to an ON signal bus, and an additional AND circuit to trigger the FLIP-FLOP to provide an OFF signal or NOT signal to other register phases and to a NOT signal bus. The first stage responds to a continuous start pulse signal and to the starting and stopping of each one of a plurality of successive pulses to provide ON and OFF output signals from each of its two register phases, which signals from one phase relate to the signals from the other phase to provide binary codes forming an output signal pattern which extends over a predetermined number of pulses and which repeats itself in response to each additional pulse group of the same number of pulses. Each of the succeeding stages is connected to respond to predetermined combinations of output signals from the preceding stage to provide its particular repeating pattern of output signals to the succeeding stage and to ON signal buses or OFF or NOT signal buses corresponding to each phase.

At the end of each pulse, readout means collect the various ON and OFF signals then present at all the phases to actuate a count indication means to indicate the number of pulses counted.

A sequence of input signals and output signals is presented in Chart I to illustrate the register operation for counting fifteen pulses. The presence or start of an input pulse is represented by the sign (+P) while the absence or termination of an input pulse signal is represented by a sign (−P). Each phase is represented by the abbreviation (Ph.). Each blank space under the output signal column represents the output of a NOT signal or OFF signal from the corresponding phase. For example, when the first pulse is applied, phase one of the first stage provides the ON output signal 1 while each of the remaining phases is providing an OFF signal.

*Chart I*

| Pulse | Input Signal | Output Signal | | | | | | |
|---|---|---|---|---|---|---|---|---|
| | | Stage 1 | | Stage 2 | | Stage 3 | | Stage 4 |
| | | Ph. 1 | Ph. 2 | Ph. 1 | Ph. 2 | Ph. 1 | Ph. 2 | Ph. 1 |
| 1 | +P | +1 | ------ | ------ | ------ | ------ | ------ | ------ |
| | −P | +1 | +2 | ------ | ------ | ------ | ------ | ------ |
| 2 | +P | ------ | +2 | +3 | ------ | ------ | ------ | ------ |
| | −P | ------ | ------ | +3 | +4 | ------ | ------ | ------ |
| 3 | +P | +1 | ------ | +3 | +4 | ------ | ------ | ------ |
| | −P | +1 | +2 | +3 | +4 | ------ | ------ | ------ |
| 4 | +P | ------ | +2 | ------ | +4 | +5 | ------ | ------ |
| | −P | ------ | ------ | ------ | ------ | +5 | +6 | ------ |
| 5 | +P | +1 | ------ | ------ | ------ | +5 | +6 | ------ |
| | −P | +1 | +2 | ------ | ------ | +5 | +6 | ------ |
| 6 | +P | ------ | +2 | +3 | ------ | +5 | +6 | ------ |
| | −P | ------ | ------ | +3 | +4 | +5 | +6 | ------ |
| 7 | +P | +1 | ------ | +3 | +4 | +5 | +6 | ------ |
| | −P | +1 | +2 | +3 | +4 | +5 | +6 | ------ |
| 8 | +P | ------ | +2 | ------ | +4 | ------ | +6 | +7 |
| | −P | ------ | ------ | ------ | ------ | ------ | ------ | +7 |
| 9 | +P | +1 | ------ | ------ | ------ | ------ | ------ | +7 |
| | −P | +1 | +2 | ------ | ------ | ------ | ------ | +7 |
| 10 | +P | ------ | +2 | +3 | ------ | ------ | ------ | +7 |
| | −P | ------ | ------ | +3 | +4 | ------ | ------ | +7 |
| 11 | +P | +1 | ------ | +3 | +4 | ------ | ------ | +7 |
| | −P | +1 | +2 | +3 | +4 | ------ | ------ | +7 |
| 12 | +P | ------ | +2 | ------ | +4 | +5 | ------ | +7 |
| | −P | ------ | ------ | ------ | ------ | +5 | +6 | +7 |
| 13 | +P | +1 | ------ | ------ | ------ | +5 | +6 | +7 |
| | −P | +1 | +2 | ------ | ------ | +5 | +6 | +7 |
| 14 | +P | ------ | +2 | +3 | ------ | +5 | +6 | +7 |
| | −P | ------ | ------ | +3 | +4 | +5 | +6 | +7 |
| 15 | +P | +1 | ------ | +3 | +4 | +5 | +6 | +7 |
| | −P | +1 | +2 | +3 | +4 | +5 | +6 | +7 |

Referring to Chart I, it will be seen that the ON output signal of the first stage is comprised of signal 1 at the start of the first pulse, signals 1 and 2 at the end of the first pulse, signal 2 at the start of the second pulse, and no signals 1 or 2 at the end of the second pulse. This pattern is repeated for every two pulses. Stage 2 begins its pattern at the start of the second pulse and continues through the start of the fourth pulse. Likewise, stages 3 and 4 begin their respective patterns on different pulses, as shown. It is seen that at the termination of each of the fifteen pulses, a different over-all combination of output signals is present so that the individual ON or OFF signals of the staggered patterns effectively produce binary pulse representations of the decimal pulse input. Inasmuch as each different combination of output signals at the end of each pulse represents a different pulse, each such combination may be combined in an AND circuit readout element to provide individual indication of respective pulse registration. Thus, each AND readout device effectively converts the binary pulse signals to decimal signals. For example, if signal buses carrying signals 1, 2, 3, 4, 5, 6 and 7 are each connected to an input of a seven input AND circuit, the fifteenth pulse is registered when all the signals are present.

As desired, additional phases may readily be provided to increase the counting capacity of the register system. The relationship between the number of pulses that can be registered for a given number of repeating register phases is expressed as $$X = 2^{\frac{(n+1)}{2}} - 1$$

where $x$ is the number of pulses and $n$ is the odd number of phases. For each stage added, the number of pulses that can be registered increases very rapidly as shown in Chart II.

*Chart II*

| n-phases | x-pulses |
|---|---|
| 1 | 1 |
| 3 | 3 |
| 5 | 7 |
| 7 | 15 |
| 9 | 31 |
| 11 | 63 |
| 13 | 127 |

For a more complete understanding of the nature and scope of this invention, reference may be made to the following detailed description which may be read in connection with the accompanying drawings in which:

FIGS. 1A through 1D arranged in order from left to right provide a schematic diagram of a magnetic amplifier logic decimal register having repeating stages;

Figure 7A:
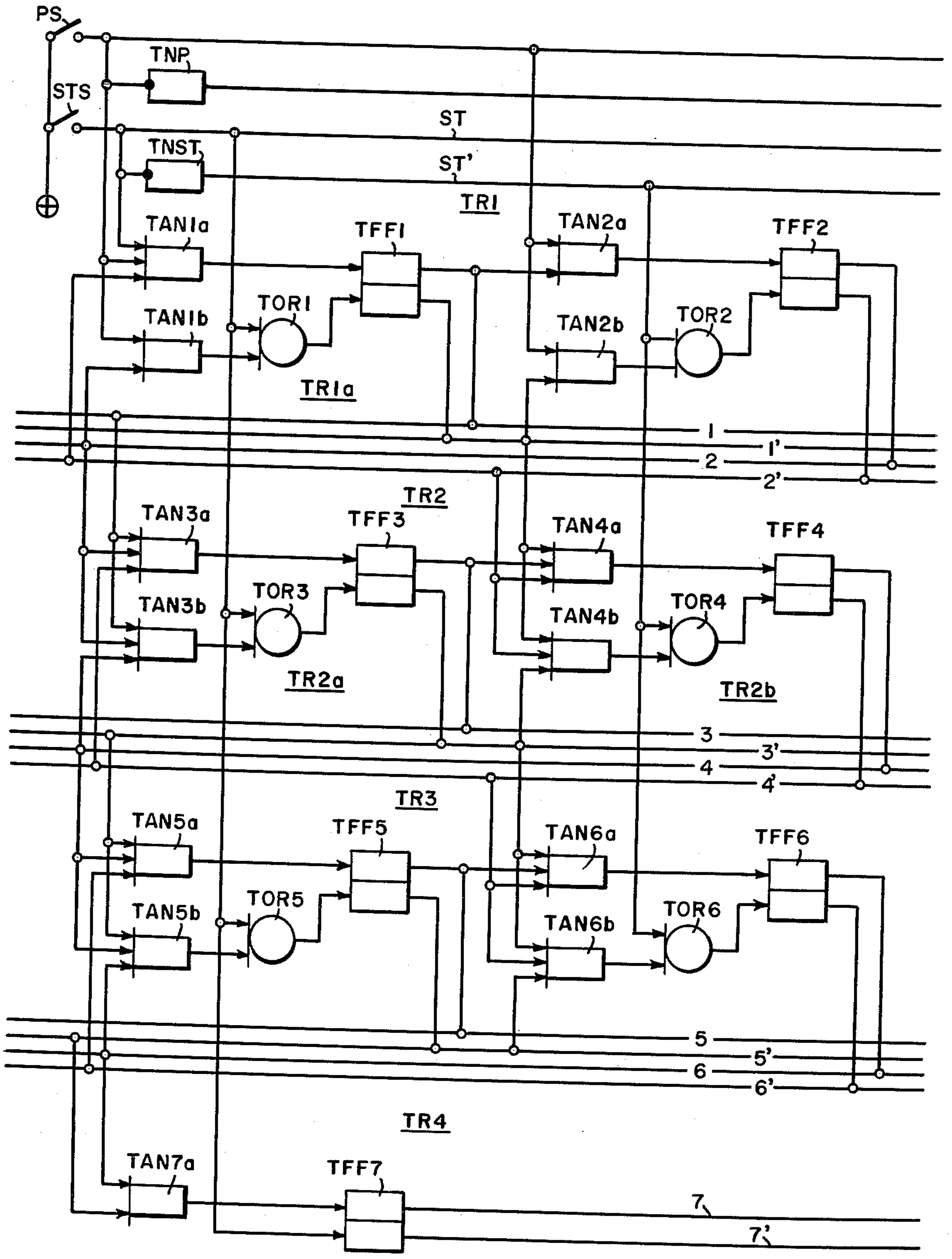
Figure 7B:
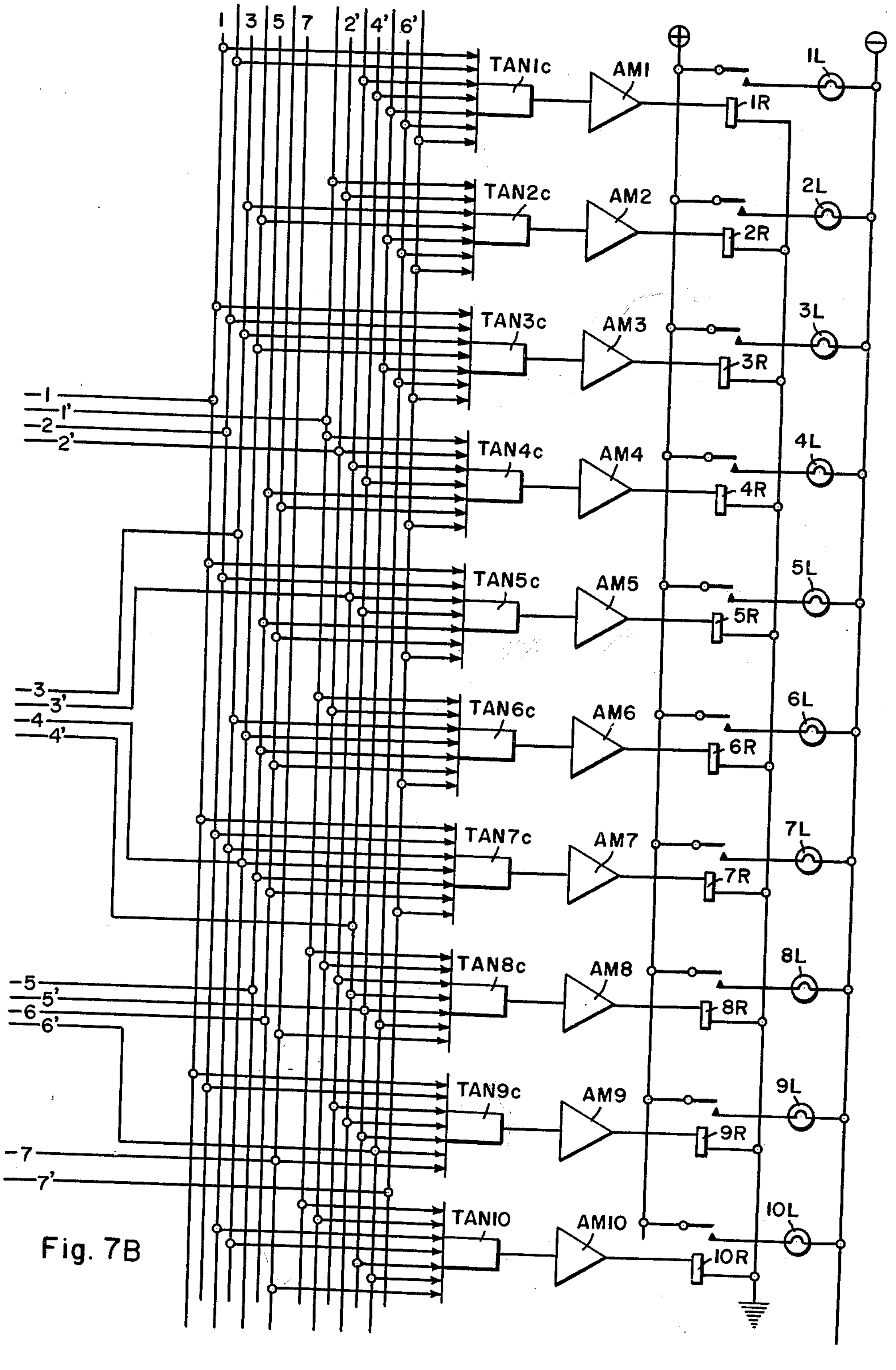
Figure 8:
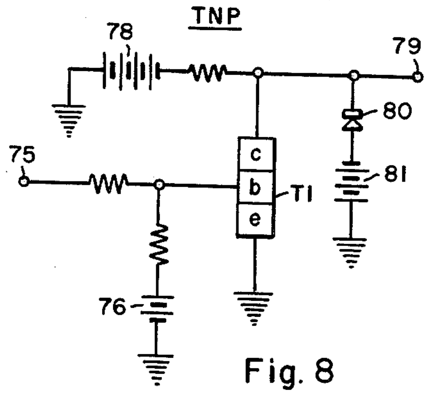
Figure 9:
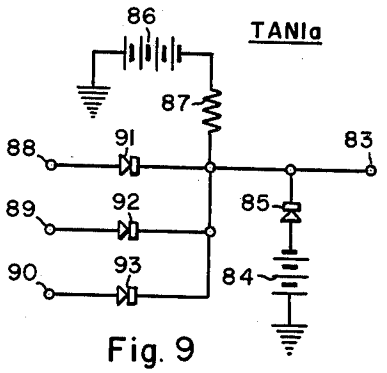
Figure 10:
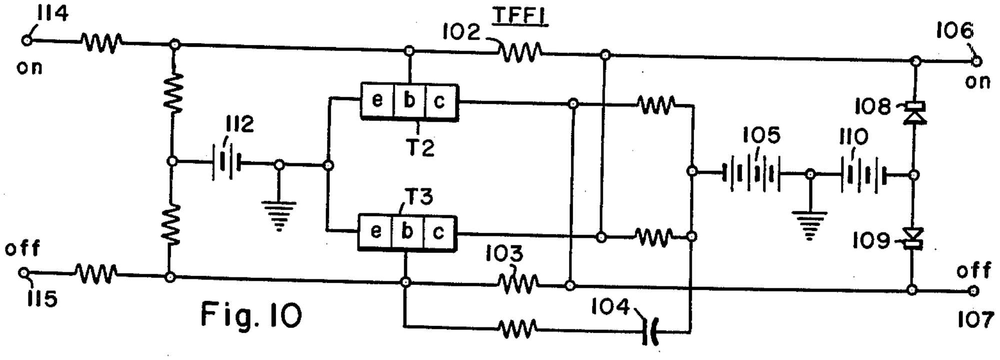
Figure 11:
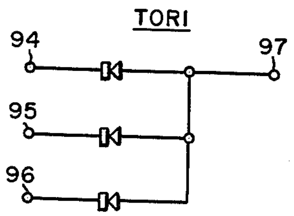
Figure 12:
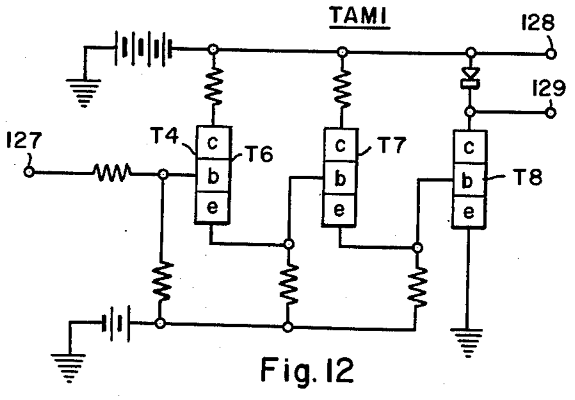

FIGS. 7A and 7B arranged in order from left to right provide a schematic diagram of a decimal pulse register circuit using transistor logic;

FIG. 8 is a schematic diagram of a NOT circuit such as used in FIGS. 7A and 7B;

FIG. 9 is a schematic diagram of an AND circuit such as used in FIGS. 7A and 7B;

FIG. 10 is a schematic diagram of a FLIP-FLOP circuit such as used in FIGS. 7A and 7B;

FIG. 11 is a schematic diagram of an OR circuit such as used in FIGS. 7A and 7B; and FIG. 12 is a schematic diagram of a relay amplifier such as used in FIGS. 7A and 7B.

As used herein, a FLIP-FLOP or memory circuit is a static circuit element which provides an output signal in response to a first condition, which output signal continues even though said first condition ceases to exist, and terminates said output signal in response to a second condition.

An OR circuit is a circuit using static elements which provides an output signal in response to any one of a plurality of input signals.

An AND circuit is a circuit using static elements, which provides an output signal only when all of a plurality of input signals are applied.

A NOT circuit is a static circuit element which provides an output signal only in response to the absence of an input signal. A NOT signal is designated hereinafter by (′) following the particular signal designation so that a NOT 1 signal is represented by 1′.

Referring to FIGS. 1A–1D, the magnetic amplifier decimal pulse register comprises four pulse register stages R1 through R4 which are operated in a predetermined repeating pattern in response to successive pulses to be counted. For purposes of illustration, the pulse signals are represented as being produced by a pulsing switch PS which connects a pulsing bus P to a source represented by the positive terminal mark. Along with the pulse signals, a start signal is applied to the register, being represented by a start switch STS which connects a start signal bus ST to the source. The NOT circuits NP and NST are provided for producing NOT signals P′ and ST′ when the signals P and ST are absent.

Basically, each of the first three register stages R1 through R3 comprises a primary phase R1*a* through R4*a*, respectively, and a secondary phase R1*b* through R3*b*, respectively. The register stage R4 is comprised of only a primary phase which is not separately numbered, to avoid providing one element with two reference numerals. Each of the individual phases, seven in all, comprises a FLIP-FLOP memory circuit FF1 through FF7, respectively, triggered to provide an ON signal by an AND circuit AN1*a* through AN7*a*, respectively. Each FLIP-FLOP circuit is provided with an additional AND circuit AN1*b* through AN6*b*, respectively, and an OR circuit OR1 through OR 6, respectively, for triggering it to provide an OFF signal to a NOT circuit.

Each of the primary phases R1*a* through R3*a* has the ON output of its corresponding FLIP-FLOP circuit connected to the input of the AND circuit of the next succeeding phase for triggering ON the succeeding FLIP-FLOP circuit, and connected to a bus which is in turn connected to readout AND circuits. The OFF output of each of the primary phase FLIP-FLOP circuits is connected to a NOT circuit to provide a NOT signal to a corresponding NOT signal bus for application to the turn off AND circuit of the next succeeding phase, to various readout AND circuits, and to both the turn on AND circuit and the turn off AND circuit of each of the second and third succeeding phases.

The stage R4, having only a primary phase and being the terminal phase, has its FLIP-FLOP circuit connected to provide an ON signal directly to the readout AND circuits.

Each of the secondary phases R1*b* through R3*b* has the ON output of its corresponding FLIP-FLOP circuit connected to the turn on AND circuit and the turn off AND circuit of the next succeeding phase to a corresponding bus for providing signals to the readout AND devices, and to the turn off AND circuit of the preceding phase. The OFF output of the corresponding FLIP-FLOP circuit is connected to the turn on AND circuit of the preceding phase, and to both the turn on AND circuit and the turn off AND circuit of the next succeeding secondary phase.

The hereinbefore described phase interconnections are explained in detail, as follows:

The AND circuit AN1*a*, for triggering FF1 to the ON condition, has inputs connected to the pulse bus P, the start pulse bus ST and the 2′ bus. The AND circuit AN1*b* has inputs connected to the P bus and the 2 bus to provide an output signal through OR circuit OR1 to trigger FLIP-FLOP circuit FF1 to the off condition. The AND circuit AN2*a*, for triggering FF2 to the on condition, has one input connected to be energized by a NOT P signal P′ obtained from the P bus through a NOT circuit NP, and has the other input connected to the output from FF1. The AND circuit AN2*b* has inputs connected to the P′ bus and the 1′ bus to provide an output signal through OR2 to trigger the FLIP-FLOP circuit FF2 to the ON condition. The AND circuits AN3*a* through AN7*a* each have inputs connected to the output from the preceding FLIP-FLOP circuit and to predetermined ones of the bus lines 1 through 7 and 1′ through 7′ for triggering ON the corresponding FLIP-FLOP circuit while each of the AND circuits AN3*b* through AN4*b* have inputs connected to predetermined ones of the bus lines 1 through 7 and 1′ through 7′ for triggering OFF the corresponding FLIP-FLOP circuit through the corresponding OR circuit. For example, the AND circuit AN3*a* has inputs connected to the 1′ bus, the output from FLIP-FLOP circuit FF2 and the 4′ bus to trigger on FLIP-FLOP circuit FF3 while AND circuit AN3*b* has inputs connected to the 1′ bus, the output from FLIP-FLOP circuit FF2 and the 4 bus to provide a signal through OR element OR3 to trigger off FLIP-FLOP circuit FF3.

Each of the OR elements OR1 through OR 6 has an input connected to the ST′ bus to trigger OFF the corresponding FLIP-FLOP circuit in response to a signal from NOT circuit NST which provides an output signal in response to the absence of a signal in the ST bus. This structure provides reset for the entire register system upon opening of the start pulse switch STS after a registration operation is completed.

Figure 1D:
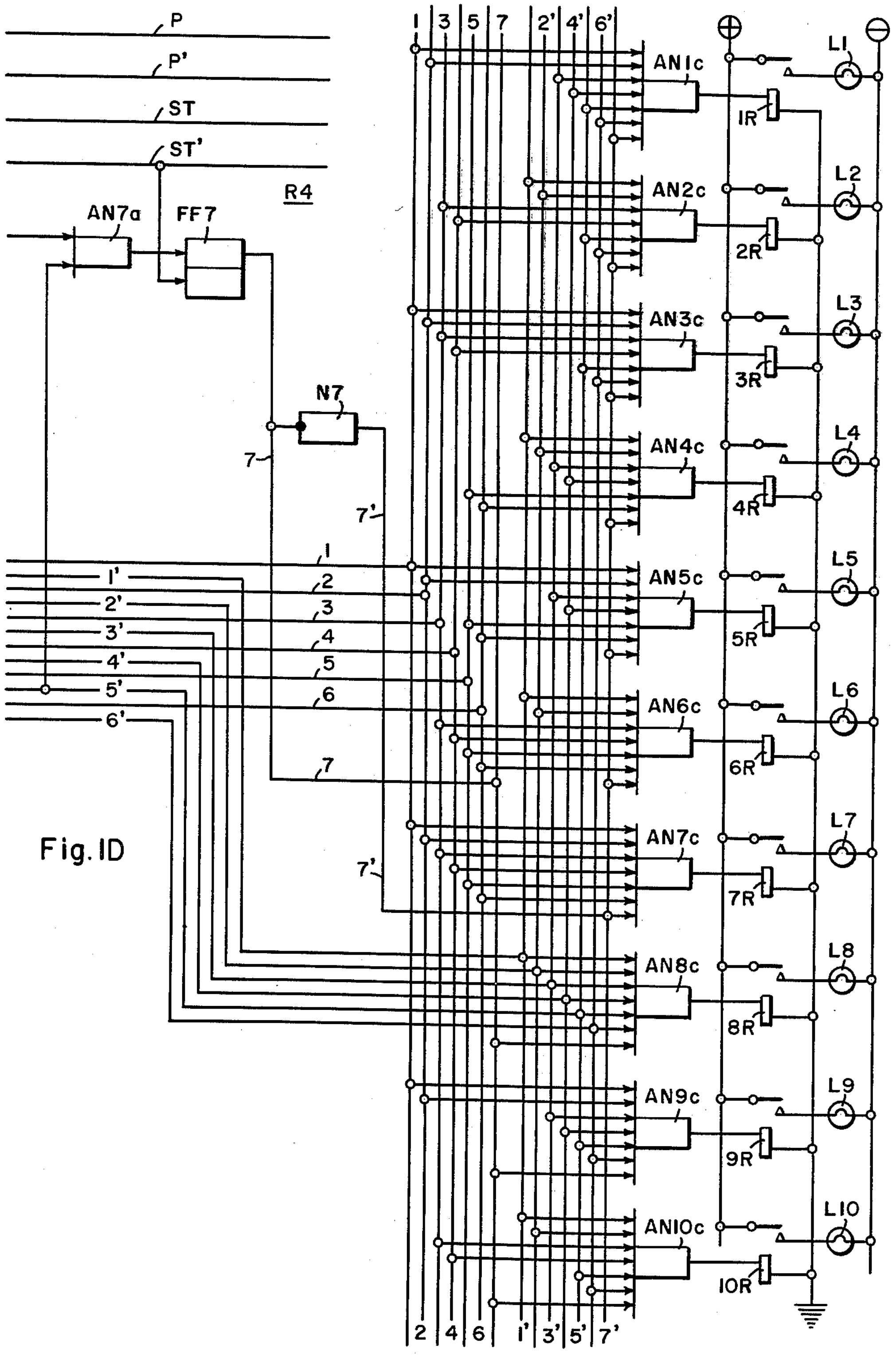

The signals from the FLIP-FLOP circuits FF1 through FF7 and the NOT circuits N1 through N7 are applied to buses 1 through 7 and buses 1′ through 7′ respectively, for distribution among the various register stages R1 through R4 in the manner hereinbefore described. These bus lines serve the additional purpose of providing different combinations of signals for indicating the total count of fifteen input pulses as illustrated in Chart I. This is accomplished by utilizing different combinations of the bus lines as inputs for fifteen readout AND circuits. Ten of these readout AND circuits AN1*c* through AN10*c* are shown in FIG. 1D, five of the readout AND circuits being omitted for convenience of illustration. Referring again to Chart I it is seen that it is desirable to provide registration of count 1 at the end of pulse 1 when stage 1 is providing its full output, namely, an ON signal from each of phases 1 and 2, and when NOT output signals are provided by all of the other phases. Therefore, the inputs of AND circuit AN1*c* are connected to buses 1, 2, 3′, 4′, 5′, 6′ and 7′ to thus provide an output only when all signals are present in these bus lines, indicating the occurrence of one pulse. Similarly, each of the AND circuits AN2*c* through AN10*c* is connected to appropriate bus lines, as indicated in the drawing, to provide an output in response to a different combination of signals as illustrated in Chart I for the termination of pulses 2 through 10 respectively.

The output from each AND circuit AN1*c* to AN10*c* are shown connected to relays 1R to 10R, respectively, for operating indicating lamps L1 through L10, respectively. This arrangement is shown for purposes of illustration only, and it is to be understood that the signals from the AND circuits AN1*c* through AN10*c* may be utilized in any suitable manner to operate different types of indicating or register devices as desired.

Figure 1A:
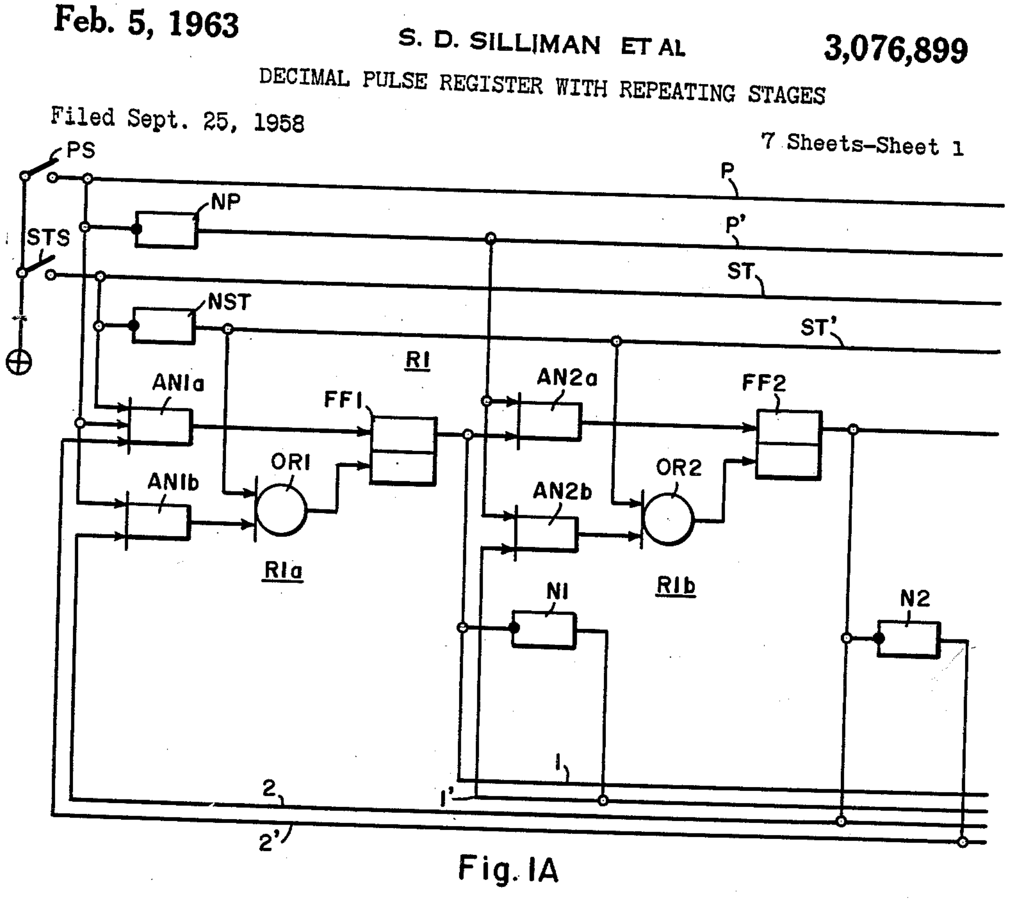
Figure 2:
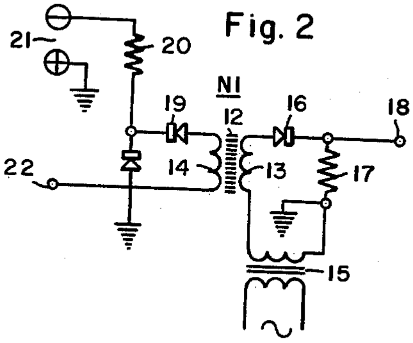
FIG. 2 is a schematic diagram of a NOT circuit such as used in the circuit of FIGS. 1A–1D.

Referring to FIG. 2, the NOT circuit N1, which is typical of the several NOT circuits used, is shown in detail as comprising a saturable magnetic core 12 having output and reset windings 13 and 14, respectively. The output winding 13 is energized from an alternating current source through a transformer 15, a rectifier 16 and an output resistor 17 for producing an output signal at the terminal 18 when the core 12 is saturated. The reset winding 14 is connected through a rectifier 19, a resistor 20 and a battery 21 to provide a non-linear magnetizing circuit. A reset signal can be applied to the terminal 22 for resetting or effecting reverse saturation of the magnetic core 12 to prevent gating of the output, as explained more fully in Patent No. 2,752,510 which issued on June 26, 1956, to William G. Hall.

Figure 3:
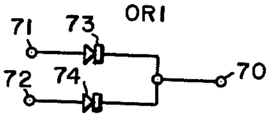
FIG. 3 is a schematic diagram of an OR circuit such as used in FIGS. 1A–1D.
Figure 1B:
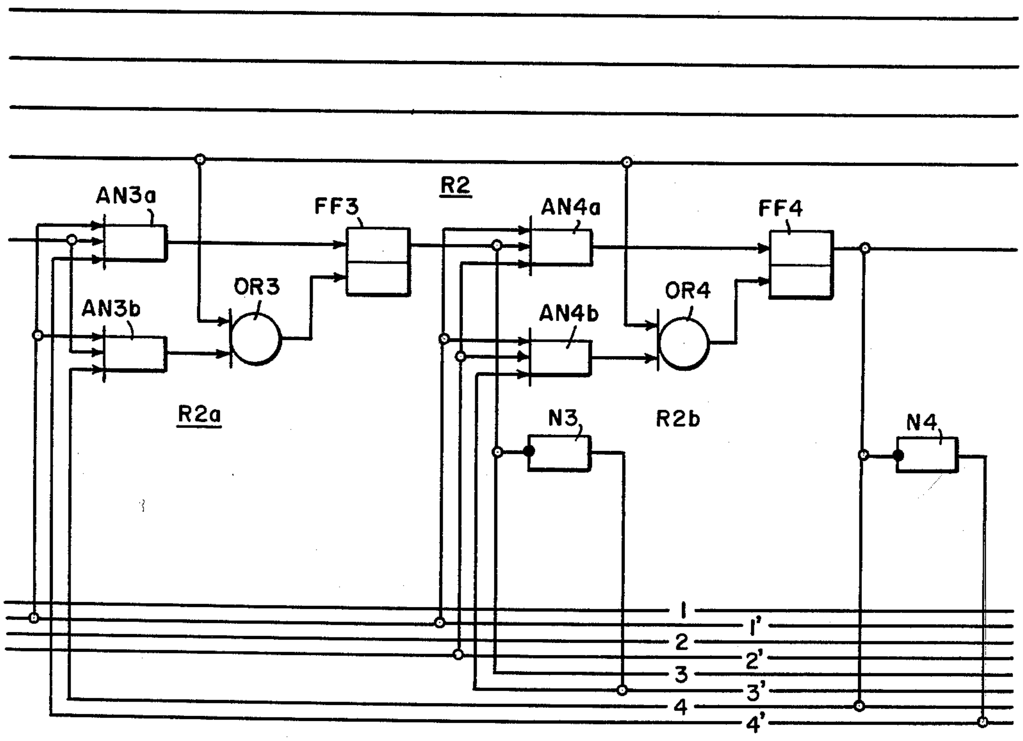

Referring to FIG. 3, it will be seen that a typical OR circuit OR1 comprises a single output terminal 70 which is connected to a plurality of input terminals 71 and 72 through rectifier devices 73 and 74, respectively, though the input signal applied to any one of the input terminals will produce an output signal. This OR circuit is typical of any of the OR circuits shown in FIG. 1.

Figure 4:
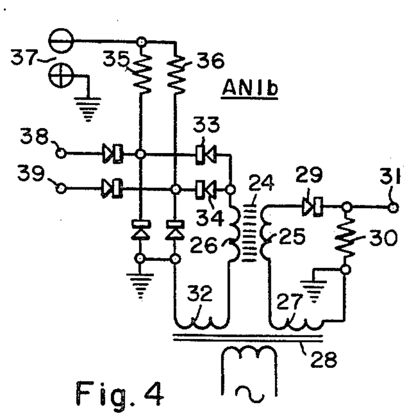
FIG. 4 is a schematic diagram of a two input AND circuit such as used in FIGS. 1A–1D.

FIG. 4 shows details of the circuitry of AND circuit AN1*b*, which is typical of the several two-input AND circuits of FIG. 1. This circuit corresponds basically to the circuit described by R. A. Ramey, Jr. in Patent No. 2,783,315 which issued on Februray 26, 1957, and comprises a magnetic core element 24 having an output winding 25 and a reset winding 26. The output winding 25 is connected to a source of alternating current through one winding 27 of a transformer 28 in circuit with a rectifier device 29 and an output resistor 30 for producing an output signal at the terminal 31 when the core 24 is saturated. The reset winding 26 is connected to another winding 32 of the transformer 28 in circuit with a pair of non-linear circuits including rectifier devices 33 and 34, resistors 35 and 36 and a battery 37 for normally providing circuits for a reset current to reset the flux in the magnetic core 24 and prevent gating of the output winding 25. When signals are applied to the input terminals 38 and 39, both of these reset circuits are blocked, and reset is prevented, so that an output signal can occur at terminal 31.

Figure 5:
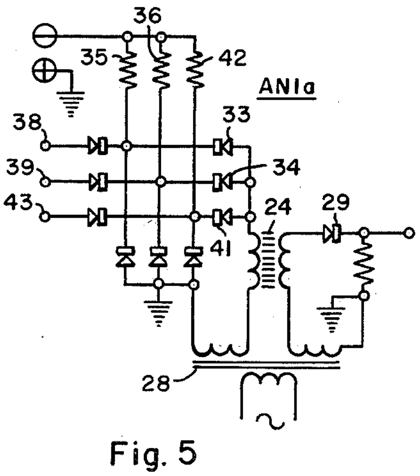
FIG. 5 is a schematic diagram of a three-input AND circuit such as used in FIGS. 1A–1D.
Figure 1C:
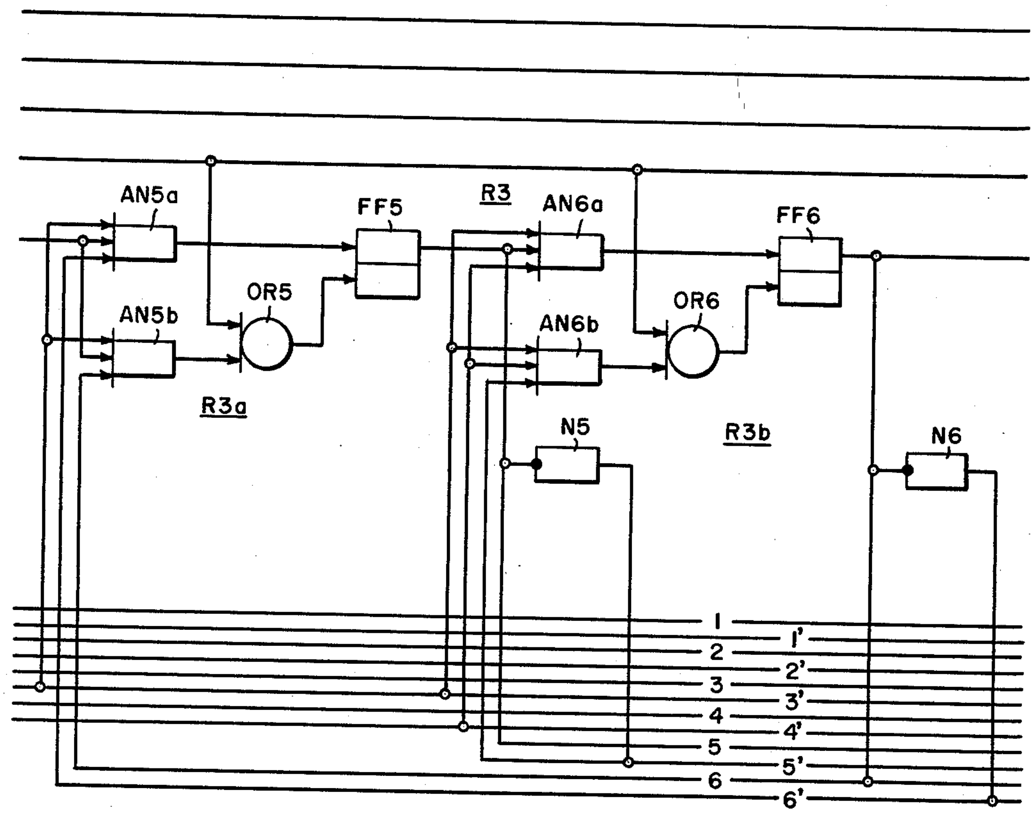

Referring to FIG. 5, a schematic diagram of AND circuit AN1*a* is shown. This circuit is similar to the circuit of FIG. 4 except that an additional reset circuit has been provided comprising rectifier device 41 and resistor 42 in parallel with the other reset circuits. An additional input terminal 43 is connected therewith for applying a blocking voltage to this reset circuit but otherwise the circuit is identical with that described in connection with FIG. 4.

Figure 6:
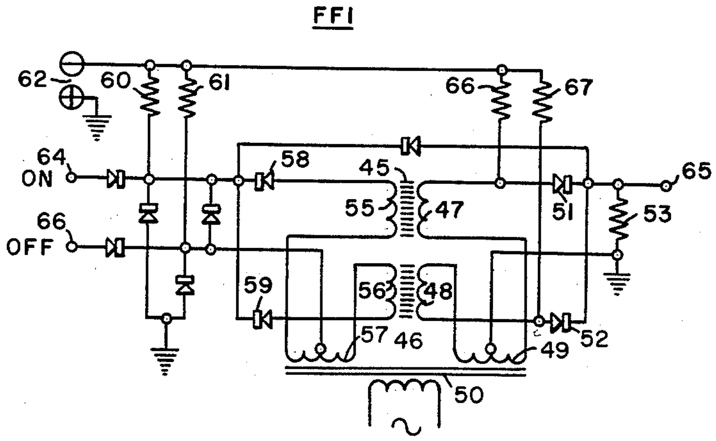
FIG. 6 is a schematic diagram of a FLIP-FLOP circuit such as used in FIGS. 1A–1D.

Referring to FIG. 6, a schematic diagram of FLIP-FLOP FF1 is shown. This circuit is described in detail in Patent Application Serial No. 511,506, filed May 27, 1955 by Robert A. Ramey and William G. Hall. This circuit comprises a pair of saturable magnetic cores 45 and 46 having output windings 47 and 48 thereon connected to the secondary winding 49 of a transformer 50 and through rectifier devices 51 and 52 to an output resistor 53. Reset windings 55 and 56 are also disposed on the core members and connected to the secondary winding 57 of the transformer 50. These windings are connected through non-linear circuits comprising rectifiers 58 and 59 and resistors 60 and 61 to a battery 62 for providing a magnetizing reset current. An ON terminal 64 is provided for applying a signal to the non-linear circuit 58—60 to prevent resetting and produce an output signal at the output terminal 65. Memory circuits comprising resistors 66 and 67 are connected from the output windings 47 and 48 to the non-linear circuit resistors 60 and 61 for blocking reset and maintaining the output even through the initiating signal is removed from the terminal 64. An OFF terminal 66 is provided for applying a signal to effect reset of the magnetic cores 45 and 46 and remove the output signal from the terminal 65.

In detail, the operation of the register shown in FIGS. 1A through 1D is as follows. When a pulse signal P first occurs, it is applied to the AND circuit AN1*a* together with the continuous start signal ST. Because the FLIP-FLOP circuit FF2 is in the off condition, NOT circuit N2 receives no input and thus provides a NOT output signal 2′ to AND circuit AN1*a*. An output signal therefore occurs at AN1*a* which is applied to FLIP-FLOP circuit FF1 triggering it to the ON condition and thus applying an output signal from FLIP-FLOP circuit FF1 to one input of AND circuit AN2*a*, to the input of NOT element N1, and to the 1 bus. Signal 1 is thus established.

When the first pulse P terminates, the input signal from bus P to NOT circuit NP is terminated thus causing NOT circuit NP to provide a NOT output signal P′ to an input of AND circuit AN2*a*. The previously described ON signal from FLIP-FLOP circuit FF1 and the now present NOT signal P′ cooperate to cause AND circuit AN2*a* to provide an output signal for triggering FLIP-FLOP circuit FF2 to the on condition. This ON signal 2 from FLIP-FLOP circuit FF2 is provided, first, to the AND circuit AN3*a* where it has no immediate effect, second, to the input of NOT circuit N2 causing it to cease providing an output signal 2′ to AND circuit AN1*a*, and, third, to the 2 bus. Signal 2 is thus established at the end of the first pulse.

Because NOT signal 2′ is no longer present at the input of AN1*a*, it ceases providing an output signal to FLIP-FLOP circuit FF1; however, inasmuch as the nature of the FLIP-FLOP is such that it continues providing an output signal until an off signal is received, signal 1 remains established along with signal 2, and register stage 1 comprised of phases R1*a* and R1*b*, is thus providing a full output signal at the termination of the first pulse as tabulated in Chart I.

Inasmuch as all of the remaining FLIP-FLOP circuits

FF3 through FF7 are in the OFF condition, their respective NOT circuits N3 through N7 respond to the absence of an input to provide NOT output signals 3' through 7' respectively to the 3' bus to the 7' bus respectively. The readout AND circuit AN1c responds to the presence of signals 1, 2, 3', 4', 5', 6' and 7' to provide an output which operates relay 1R to energize lamp L1. The registration of the first pulse is now indicated.

When pulse signal P occurs for the second time, it cooperates with the previously established signal 2 provided from FLIP-FLOP circuit FF2 to cause AND circuit AN1*b* to provide an output signal through OR element OR1 to trigger FLIP-FLOP circuit FF1 to the OFF condition. The absence of an ON signal 1 from FLIP-FLOP circuit FF1 and the absence of NOT signal R' causes AND circuit AN2*a* to cease providing an output to FLIP-FLOP circuit FF2 which nevertheless continues providing an output signal 2 pending reception of an OFF signal. Also, the termination of signal 1 from FF1 to the 1 bus eliminates an input to the readout AND circuit AN1*c* causing it to cease providing an output to relay 1R and to lamp L1. Further, the elimination of signal 1 causes NOT circuit N1 to reestablish NOT signal 1' which is applied through the 1' bus to the inputs of AND circuits AN2*b*, AN3*a*, AN3*b*, AN4*a* and AN4*b*. The 1' signal input to AND circuit AN3*a* cooperates with a NOT signal 4' from NOT circuit N4 and the previously established 2 signal from FLIP-FLOP circuit FF2 causing AND circuit AN3*a* to provide an output triggering the FLIP-FLOP circuit FF3 to the ON condition. Signal 3 is thus established along with the previously established signal 2 and the register is in the condition indicated for the start of pulse 2 in Chart I.

When the second pulse terminates, the NOT signal P' occurs as before but now cooperates with the reestablished 1' signal from NOT circuit N1 to cause AND circuit AN2*b* to provide a signal through OR element OR2 to trigger OFF the FLIP-FLOP element FF2 which ceases providing a signal to each of the AND circuits AN3*a* and AN3*b*, and to the NOT circuit N2 which then provides an output to reestablish the NOT signal 2' to the 2' bus. The absence of a 2 input signal to AND circuit AN3*a* causes it to cease providing an output signal to FF3 which nevertheless continues providing an output to the AND circuit AN4*a*. The AND circuit AN4*a* responds to the presence of the 3 signal from FLIP-FLOP circuit FF3, the 1' signal from NOT circuit N1 and the 2' signal from N2 to provide an output triggering on FLIP-FLOP circuit FF4. Signal 4 is thus established along with the previously established signal 3 and thus stage 2 is providing a full output signal comprised of signals 3 and 4. Signals 1 and 2 are off. Thus the register is in the condition indicated for the end of pulse 2 in Chart I.

The readout AND circuit AN2*c* responds to the presence of signals 1', 2', 3, 4, 5', 6' and 7' to provide an output which operates relay 2R to energize lamp L2. The registration of the second pulse is now indicated.

When the second pulse is terminated, it is seen that register stage R1 has reassumed the condition prevailing prior to the occurrence of the first pulse, that is, the FLIP-FLOP circuits FF1 and FF2 are in the OFF condition while their respective NOT circuits N1 and N2 are providing NOT signals 1' and 2', respectively. Thus, register stage R1 has completed a run of its signal pattern in response to the first two pulses and is now in condition to repeat its signal pattern in response to the third and fourth pulses.

When the third pulse occurs, the register stage R1 provides the 1 signal and terminates the 1' signal as before. The termination of the 1' signal to the input of AND circuit AN3*a* causes it to cease providing an output to FLIP-FLOP circuit FF3 which nevertheless continues providing the previously established signal 3 providing reception of an off signal. The FLIP-FLOP circuit FF4 continues providing previously established signal 4.

When the third pulse terminates, register stage R1 provides signals 1, 2 while terminating signals 1' and 2' as before. The absence of the 2' signal at the input of AN4*a* causes it to cease providing an output to the FLIP-FLOP circuit FF4 which continues providing signal 4. Thus, at the end of the third pulse, register stage R1 provides signals 1 and 2 while register stage R2 provides signals 3 and 4, as tabulated in Chart I. The readout AND circuit AN3*c* responds to the presence of signals 1, 2, 3, 4, 5', 6' and 7' to operate relay 3R to energize lamp L3. The registration of the third pulse is now indicated.

When the fourth pulse occurs, the register stage R1 reestablishes NOT signal 1', as before, which cooperates with signal 4 from FLIP-FLOP circuit FF4 to cause AND circuit AN3*b* to provide a signal triggering off FLIP-FLOP circuit FF3 which reestablishes the 3' signal from NOT circuit N3. The 3' signal from NOT circuit N3, cooperates with the 4 signal from FLIP-FLOP circuit FF4 and a NOT signal 5' from NOT circuit N5 of register stage R5 to cause AND circuit AN5*a* to provide an output for triggering on FLIP-FLOP circuit FF5. The signal 5 is thus established.

When the fourth pulse terminates, signal 2' is reestablished, as at the end of the second pulse, to cooperate with the 1' signal and the 3' signal to cause AND circuit AN4*b* to provide a signal triggering off FLIP-FLOP circuit FF4 to reestablish the 4' signal. The presence of signal 3' from NOT circuit N3, the signal 4' from NOT circuit N4 and the signal 5 from FLIP-FLOP circuit FF5 at the inputs of AND circuit AN6*a* causes it to provide a signal triggering the FLIP-FLOP circuit FF6 to the ON condition. The signal 6 is thus established.

At the end of the fourth pulse, the register stages R1 and R2 have completed their signal patterns and have returned to the condition prevailing prior to the occurrence of the first pulse. Thus, the individual signal patterns of register stages R1 and R2 combine to form a larger pattern extending over four pulses. This four pulse pattern will be repeated for every additional four pulses. Also, at the termination of the fourth pulse, signals 5 and 6 are established to provide a full output signal for register stage R3. The readout AND circuit AN4*c* responds to this overall signal condition to energize lamp 14 in the same basic manner as AND circuits AN1*c* through AN3*c* operated their respective lamps L1 through L3.

The output signals 5 and 6 from register stage R3 remain established through the occurrence of pulses 5, 6 and 7 to cooperate with the different combinations of signals in the repeating signal patterns provided by register stages R1 and R2 to successively operate the indicating lamps L5, L6 and L7 in a manner similar to that previously described in detail with respect to the operation of the stages R1 and R2.

When the eighth pulse begins, the signals 3' and 4 are reestablished, as at the end of the fourth pulse. These two signals cooperate with signal 6 causing the AND circuit AN5*b* to provide an output for triggering the FLIP-FLOP circuit FF5 to the OFF condition thus reestablishing signal 5' from NOT circuit N5. The 5' signal cooperates with the signal 6 to cause AND circuit AN7*a* to provide an output triggering ON the FLIP-FLOP circuit FF7. The signal 7 is thus established and remains throughout the succeeding pulses 9 through 15 because of the lack of a reset AND circuit for the FLIP-FLOP circuit FF7.

When the eighth pulse terminates, signals 3' and 4' are established, as at the end of the fourth pulse, to cooperate with the 5' signal causing AND circuit AN6*b* to provide a signal triggering off the FLIP-FLOP circuit FF6.

At the end of the eighth pulse, the register stages R1, R2 and R3 are in condition to begin repeating their cumulative signal pattern which has occurred over the first eight pulses and which will now be combined with established signal 7. The different signal combinations energize the appropriate readout AND circuits in a manner which is obvious in view of the drawing disclosure and the foregoing description of similar operations of readout AND circuits AN1*c* through AN4*c*.

At the end of a register operation, the start signal ST terminates to provide a NOT signal S'T' from NOT circuit NST to reset all the FLIP-FLOP circuits FF1-FF6 through OR elements OR1 through OR6 respectively, and to directly reset FLIP-FLOP circuits FF7.

Referring now to FIGS. 7A and 7B, there is disclosed a decimal pulse register comprised of transistor logic circuits rather than magnetic amplifier logic circuits. Basically, the register logic is the same as that of FIGS. 1A through 1D, wherein four repeating register stages TR1 through TR4 respond to consecutive pulses to provide outputs which are combined to successively operate a plurality of relays 1R through 10R to energize indicating lamps 1L through 10L. However, inasmuch as the phase relationship among ganged transistor logic elements is unimportant, in contrast to ganged magnetic amplifier logic elements wherein the gating output of the driving element must be in phase with the reset input of the driven element, the OFF condition output signals 1' through 7' from the FLIP-FLOP circuit TFF1 through TFF7, respectively, may be connected directly to the buses 1' through 7' respectively, thus permitting elimination of six NOT circuits which would be equivalent to NOT circuits N1 through N7 of FIGS. 1A through 1D. This difference in basic logic structure provides a considerable reduction in the number of transistors which would otherwise be required.

In addition, amplifier circuits AM1 through AM10 are provided to amplify the output stages. The start signal ST, the NOT signal ST', the start pulse P and the NOT signal P' are produced in the same manner as hereinbefore described with respect to FIG. 1. The structure and operation of the respective register stages TR1 through TR4 are individually and collectively identical to that of their counterparts in FIG. 1, except for the hereinbefore described absence of NOT circuits operated by the FLIP-FLOP circuits. For example, when FLIP-FLOP circuit TFF1 is triggered to the off condition, it provides NOT signal 1' directly to the 1' bus to provide the same result as the combined FLIP-FLOP circuit FF1 and associated NOT circuit N1 in the magnetic amplifier circuit of FIG. 1.

Referring to FIG. 8, the circuitry of the NOT element TNP is shown in detail, and comprises a transistor T1 having its emitter *e* grounded and its base electrode *b* connected to an input terminal 75 for rendering the transistor conductive in response to the application of a negative signal. A battery 76 is connected to the base electrode *b* to make the base electrode positive and normally bias the transistor to cut off. The collector *c* is connected to the negative terminal of a 45 volt battery 78 and to an output terminal 79 for producing an output signal when the transistor T1 is cut off. A clamping diode 80 connects the output terminal to a 15 volt battery 81. Whenever a negative signal is applied to the input signal 75, the base *b* is made negative, and the transistor T1 saturates connecting the collector *c* to ground so as to drop the output voltage of the output terminal 79.

Referring to FIG. 9, the AND circuit shown corresponds to that of TAN1*a* which has an output terminal 83 connected to a battery 84 by a clamping diode 85 and connected to the negative terminal of a battery 86 through a resistor 87. Input terminals 88, 89 and 90 are connected to the output terminal 83 through diodes 91, 92 and 93 for grounding the output terminal when no signal is applied, thus preventing any output. Signals must be applied to all of the input terminals to prevent grounding the output terminal for obtaining an output.

FIG. 10 is a schematic diagram of a transistor FLIP-FLOP circuit, such as circuit TFF1. Transistors T2 and T3 have their emitters *e* connected to ground, and have their base electrodes *b* and collectors *c* cross-connected through resistors 102 and 103. A capacitor 104 is connected between the base electrode of transistor T3 and the battery source 105 so that when the FLIP-FLOP is first energized, the charging current of the capacitor will saturate the transistor T3 so that the ON output terminal 106 is effectively grounded and no ON signal is obtained. Transistor T2 remains unsaturated so that the OFF output terminal 107 is substantially the full negative potential of the battery 105 and provides an OFF signal. The clamping diodes 108 and 109 connect the output terminals to ground through a 15 volt battery 110. The base electrodes *b* are normally biased positive by a battery 112, and ON and OFF input terminals 114 and 115 are connected to the base electrodes of transistors T2 and T3, respectively, for triggering the FLIP-FLOP to the ON and OFF condition in response to application of negative signals.

Referring to FIG. 11, an OR circuit is illustrated, such as the OR circuit TOR1 which has three input terminals 94, 95 and 96 and a single output terminal 97. The input terminals are connected to the output terminals through rectifier devices 98, 99 and 100 so that a negative signal on any one of the inputs produces a negative signal on the output terminal.

In FIG. 12 there is shown a relay amplifier TAM1 comprising an input terminal 127 connected to the base electrode *b* of a transistor T6 for effecting saturation thereof in response to the application of a negative signal. The base *b* of a transistor T7 is connected to the emitter *e* of transistor T6 for supplying base current to the transistor T7 whenever transistor T6 is saturated. Transistor T7 likewise has its emitter *e* connected to the base electrode *b* of an output transistor T8 for rendering it conductive to provide an output signal at the output terminals 128 and 129 for operating a relay or the like.

In operation the register of FIGS. 7A and 7B is substantially identical to that of FIGS. 1A through 1D, so that output signals occur from the first stage in a predetermined repeating pattern in response to successive pulses and so that the successive stages each provide output signals in predetermined repeating patterns in response to the signal patterns from the preceding stage, resulting in the tabulation as set forth in Chart I, so long as the start signal is continued.

From the foregoing description and the accompanying drawings, it will be apparent that there has been provided in a simple, effective manner an apparatus for counting successive pulses in a decimal system by using a minimum number of static logic circuit elements arranged in stages having repeating output signal patterns for indicating a maximum number of pulses. Additional stages may be easily provided, as desired, causing an exponential increase in the counting capacity of the register system.

Since certain changes may be made in the above construction and different embodiments of the invention may be made without departing from the scope thereof, it is intended that all matter contained in the above description or shown in the accompanying drawings shall be interpreted as illustrative and not in a limiting sense.

We claim as our invention:

1. In a decimal pulse register: a plurality of register stages connected in tandem, each comprising a primary phase and a secondary phase with each phase having a first and second output and comprised of a first static AND element and a second static AND element, and means including a static FLIP-FLOP element for providing a signal to the first output in response to a triggering signal from the first static AND element or providing a signal to the second output in response to a triggering signal from the second static AND element; a further stage connected in tandem to the last stage of said plurality of stages, and comprising a primary phase only having a first and second output and comprised of a first static AND element and means including a FLIP-FLOP element for providing a signal to the first output in response to a triggering signal from the single static AND element or providing a signal to the second output before the FLIP-FLOP is triggered; circuit means connected to the input of the first static AND element of the primary phase of one register stage to apply a continuous start pulse and successive pulses thereto; circuit means connected to provide a signal to the input of the first static AND element of the secondary pulse of said one register stage upon termination of each pulse; means connecting the first output from each primary phase to the input of the first AND element of the corresponding secondary phase; means connecting the second output from each primary phase to the second static AND element of the corresponding secondary phase, and to all static AND circuits of each phase of the next succeeding stage; means connecting the first output of each secondary phase to the second AND circuit of the preceding phase; means connecting the second output of each secondary phase to the first static AND element of the preceding phase and to all static AND elements of the next succeeding secondary phase.

2. In a decimal pulse register; a plurality of pairs of signal conductors each pair corresponding to one position in a binary code; a plurality of register phases each corresponding to one pair of said pairs of signal conductors and including static element means to provide a signal to either one or the other of the conductors in response to either one or the other of two static element input means, respectively; circuit means providing a signal at the start of each pulse and including means to provide a signal at the termination of each pulse and means to provide a continuous start pulse; additional circuit means interconnecting said circuit means with the said two static element means of each one of a pair of said phases to provide a signal to one or the other conductor of each corresponding conductor pair to provide a different combination of signals in the different corresponding conductors for each pulse start condition and each pulse stop condition, forming a pattern of signal combinations repeating itself in response to each occurrence of a predetermined number of input pulses; circuit means interconnecting each succeeding pair of phases to each other and connecting the pairs in tandem to provide a corresponding signal pattern in each pair of phases, the pattern repeating itself in response to each reoccurrence of predetermined signals from the preceding pair of phases including the said one pair of phases in one instance, and with the output signal combinations of each pair of phases relating to the output signal combinations of the others to provide a different combination of signals from all phase pairs taken cumulatively at the starting and stopping of each pulse; and readout means comprised of a plurality of static AND elements each connected to the appropriate signal conductor of each pair of said signal conductors to provide an output at the termination of a different one of successive input pulses.

3. In a decimal pulse register: a plurality of register stages each comprising a primary phase and a secondary phase with each phase having a first and second output and comprised of a first AND element and a second AND element, and means including a FLIP-FLOP element for providing a signal to the first output in response to a triggering signal from the first AND element or providing a signal to the second output in response to a triggering signal from the second AND element; circuit means connected to the input of the first AND element of the primary phase of one register stage to apply a continuous start pulse and successive pulses thereto; circuit means connected to provide a signal to the input of the first AND element of the secondary phase of said one register stage upon termination of each pulse; means connecting the first output from each primary phase to the input of the first AND element of the corresponding secondary phase; means connecting the second output from each primary phase, to the second AND element of the corresponding secondary phase, and to both AND circuits of each of the second and third succeeding phases; means connecting the first output of each secondary phase, to both AND elements of the next succeeding primary phase and to the second AND circuit of the preceding phase; means connecting the second output of each secondary phase to the first AND element of the preceding phase and to both AND elements of the next succeeding secondary phase.

4. In a counter: a first stage having two stable states and responsive to the starting and stopping of each one of successive pulses of varying lengths to provide a different combination of stable state output signals at the beginning and also at the end of each successive incoming pulse to form a predetermined signal pattern extending over a predetermined number of pulses and repeating itself in response to each additional group of pulses being the same in number as said predetermined number of pulses; a plurality of additional stages each having two stable states and connected in tandem with the first stage and each responsive to the signal combinations from the preceding stage including the first register stage as a preceding stage in one instance, and each providing stable state output signals in combinations forming a repeating pattern, with the signal combinations of each stage pattern relating to the signal combinations of the others to provide a different output pulse code for each beginning and ending of each different one of successive input pulses.

5. In a counter: a plurality of stages each comprising a primary phase and a secondary phase with each phase having a first and second output and comprised of a first AND element and a second AND element, and means including a FLIP-FLOP element for providing a signal to the first output in response to a triggering signal from the first AND element or providing a signal to the second output in response to a triggering signal from the second AND element; a further stage connected in tandem to the last stage of said plurality of stages and comprising a primary phase only, said primary phase comprising a first and second output, a first AND element and means including a FLIP-FLOP element for providing a signal to the first output in response to a triggering signal from the first AND element or providing a signal to the second output before the FLIP-FLOP is triggered; circuit means connected to the input of the first AND element of the primary phase of one register stage to apply a continuous start pulse and successive pulses thereto; circuit means connected to provide a signal to the input of the first AND element of the secondary phase of said one register stage upon termination of each pulse; means connecting the first output from each primary phase to the input of the first AND element of the corresponding secondary phase; means connecting the second output from each primary phase to the second AND element of the corresponding secondary phase, and to all AND circuits of each phase of the next succeeding stage; means connecting the first output of each secondary phase, to both AND elements of the next succeeding primary phase and to the second AND circuit of the preceding phase; means connecting the second output of each secondary phase to the first AND element of the preceding phase and to both AND elements of the next succeeding secondary phase.

6. In a counter: a plurality of pairs of signal conductors each pair corresponding to one position in a binary code; a plurality of counter phases each corresponding to one pair of said pairs of signal conductors and including means to provide a signal to either one or the other of the conductors in response to either one or the other of two input means, respectively; circuit means providing a signal at the start of each pulse and including means to provide a signal at the termination of each pulse; additional circuit means interconnecting said circuit means with one pair of said phases to provide a signal to one or the other of the corresponding conductor pair to provide a different combination of signals in different conductors for each pulse start condition and each pulse stop condition forming a pattern of signal combinations repeating itself in response to each occurrence of a predetermined number of input pulses; circuit means interconnecting each succeeding pair of phases to each other to provide a corresponding signal pattern repeating itself in response to each reoccurrence of predetermined signals from the preceding pair of phases including the said one pair of phases in one instance, and with the output signal combinations of each pair of phases relating to the output signal combinations of the others to provide a different combination of signals from all phase pairs taken cumulatively at each starting and stopping of each pulse.

7. In a counter: a plurality of stages each comprising a primary phase and a secondary phase with each phase having a first and second output and comprised of a first AND element and a second AND element, a NOT element having an input and having an output connected to said second output, and a FLIP-FLOP element for providing a signal to the first output in response to a triggering signal from the first AND element or providing a signal to the NOT input in response to a triggering signal from the second AND element; circuit means connected to the input of the first AND element of the primary phase of one stage to apply a continuous start pulse and successive pulses thereto; circuit means connected to provide a signal to the input of the first AND element of the secondary phase of said one register stage upon termination of each pulse; means connecting the first output from each primary phase to the input of the first AND element of the corresponding secondary phase; means connecting the second output from each primary phase, to the second AND element of the corresponding secondary phase, and to both AND circuits of each of the second and third succeeding phases; means connecting the first output of each secondary phase to both AND elements of the next succeeding primary phase and to the second AND circuit of the preceding phase; means connecting the second output of each secondary phase to the first AND element of the preceding phase and to both AND elements of the next succeeding secondary phase.

8. In a pulse counter: a first stage having two stable states and each comprised of transistor logic elements and responsive to the starting and stopping of each one of successive pulses of varying lengths to provide a different combination of output signals at the beginning and also at the end of each successive incoming pulse to form a predetermined signal pattern extending over a predetermined number of pulses and repeating itself in response to each additional group of pulses being the same in number as said predetermined number of pulses; a plurality of additional stages each having two stable states and each comprised of transistor logic elements and each responsive to predetermined signal combinations from the preceding stage including the first register stage as a preceding stage in one instance, and each providing output signals in combinations forming a repeating pattern, with the signal combinations of each register stage pattern relating to the signal combinations of the others to provide different output pulse codes each corresponding to a different beginning and ending of a different one of successive input pulses.

References Cited in the file of this patent

UNITED STATES PATENTS

| | | |
|---|---|---|
| 2,584,363 | Mumma | Feb. 5, 1952 |
| 2,764,343 | Diener | Sept. 25, 1956 |
| 2,816,223 | Nelson | Dec. 10, 1957 |
| 2,844,310 | Cartwright | July 22, 1958 |
| 2,853,238 | Johnson | Sept. 23, 1958 |
| 2,953,735 | Schmidt | Sept. 30, 1960 |

FOREIGN PATENTS

| | | |
|---|---|---|
| 765,935 | Great Britain | Jan. 16, 1957 |